United States Patent
Liao et al.

(10) Patent No.: US 11,693,231 B2
(45) Date of Patent: Jul. 4, 2023

(54) DISTURBANCE REJECTION FOR LASER BEAM SCANNING DISPLAY

(71) Applicant: MICROSOFT TECHNOLOGY LICENSING, LLC, Redmond, WA (US)

(72) Inventors: Wenjun Liao, Mountain View, CA (US); Chuan Pu, Foster City, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 399 days.

(21) Appl. No.: 16/920,631

(22) Filed: Jul. 3, 2020

(65) Prior Publication Data

US 2022/0003983 A1   Jan. 6, 2022

(51) Int. Cl.
G02B 26/08 (2006.01)
G02B 26/10 (2006.01)
H04N 9/31 (2006.01)
G02B 27/01 (2006.01)

(52) U.S. Cl.
CPC ....... *G02B 26/0841* (2013.01); *G02B 26/101* (2013.01); *G02B 26/105* (2013.01); *H04N 9/3135* (2013.01); *H04N 9/3161* (2013.01); *G02B 27/0172* (2013.01)

(58) Field of Classification Search
CPC .............. G02B 26/0841; G02B 26/101; G02B 26/105; G02B 27/0172; H04N 9/3135; H04N 9/3161

USPC .................................. 359/291, 630; 345/7-8
See application file for complete search history.

(56) References Cited

U.S. PATENT DOCUMENTS

| 2010/0073748 | A1  | 3/2010 | Holmes et al. |
| 2014/0192078 | A1* | 7/2014 | Gilbert ................. G09G 3/3406 345/590 |
| 2019/0020860 | A1  | 1/2019 | Mcvittie |
| 2021/0011133 | A1* | 1/2021 | Morarity ................. G01S 7/484 |

FOREIGN PATENT DOCUMENTS

EP   2818909 A1   12/2014

OTHER PUBLICATIONS

"International Search Report and Written Opinion Issued in PCT Application No. PCT/US21/028739", dated Oct. 25, 2021, 11 Pages.

* cited by examiner

*Primary Examiner* — William Choi
(74) *Attorney, Agent, or Firm* — Han Gim; Newport IP, LLC

(57) ABSTRACT

A laser beam scanning ("LBS") display device is configured with an optical system that includes a laser beam emitter configured to emit a laser beam. The optical system also includes a driver configured to generate a driving signal for controlling a mirror, such as a microelectromechanical systems ("MEMS") mirror. The optical system also includes a controller configured to generate a driving signal while rejecting a system disturbance response.

12 Claims, 12 Drawing Sheets

DISTURBANCE REJECTION FOR LASER BEAM SCANNING DISPLAY

BACKGROUND

Laser beam scanning ("LBS") display devices form displayed images by using mirrors, such as microelectromechanical systems ("MEMS") mirrors, to direct a laser beam onto a display region. In such display devices, the mirrors may move over the course of a frame to control the location in the display region toward which the laser beam is directed. Some LBS displays use two mirrors, a fast-scan mirror that scans under resonance and a slow-scan mirror that scans linearly. Mirrors used by LBS display devices are susceptible to sudden disturbance forces (e.g., electrical or mechanical).

The disclosure made herein is presented with respect to these and other technical challenges.

SUMMARY

The technologies disclosed herein provide functionality for minimizing the impact on the slow-scan mirror's trajectory in an LBS display device under sudden disturbance forces (e.g., electrical or mechanical). Through implementations of the disclosed technologies, a slow-scan mirror controller can closely follow the target trajectory under various operating conditions while providing improved disturbance rejection. Other technical benefits not specifically mentioned herein can also be realized through implementations of the disclosed subject matter.

In order to realize the technical benefits mentioned briefly above, and potentially others, an LBS display device includes a laser beam emitter configured to emit a laser beam. The LBS display device also includes a mirror control system that includes a driver configured to generate a driving signal for controlling a mirror, such as a MEMS mirror. The mirror is configured to reflect the laser beam onto a display region to generate an image. In some embodiments, the LBS display device includes two mirrors, a fast-scan mirror that scans under resonance and a slow-scan mirror that scans linearly.

In one embodiment, the mirror control system also includes a prefilter and feedback loop configured to provide disturbance rejection while maintaining control loop stability. The mirror control system may be configured to provide additional gain to cancel the peak in the control system disturbance rejection response and suppress the disturbance influence on the MEMS/device. In one implementation, the prefilter and the feedback loop may be configured with the same transfer function as the slow scan mirror. In some embodiments, the mirror control system may include a notch filter, such as an adaptive notch filter (ANF). Additionally, compensators (e.g., lead/lag compensators) may be added to improve stability of the control loop with increased phase margin and gain margin.

The described embodiments may be implemented as hardware, software, or a combination of hardware and software. These and various other features will be apparent from a reading of the following Detailed Description and a review of the associated drawings. This Summary is provided to introduce a selection of concepts in a simplified form that are further described below in the Detailed Description. This Summary is not intended to be used to limit the scope of the claimed subject matter. Furthermore, the claimed subject matter is not limited to implementations that solve any or all disadvantages noted in any part of this disclosure.

DETAILED DESCRIPTION

Figure 1:
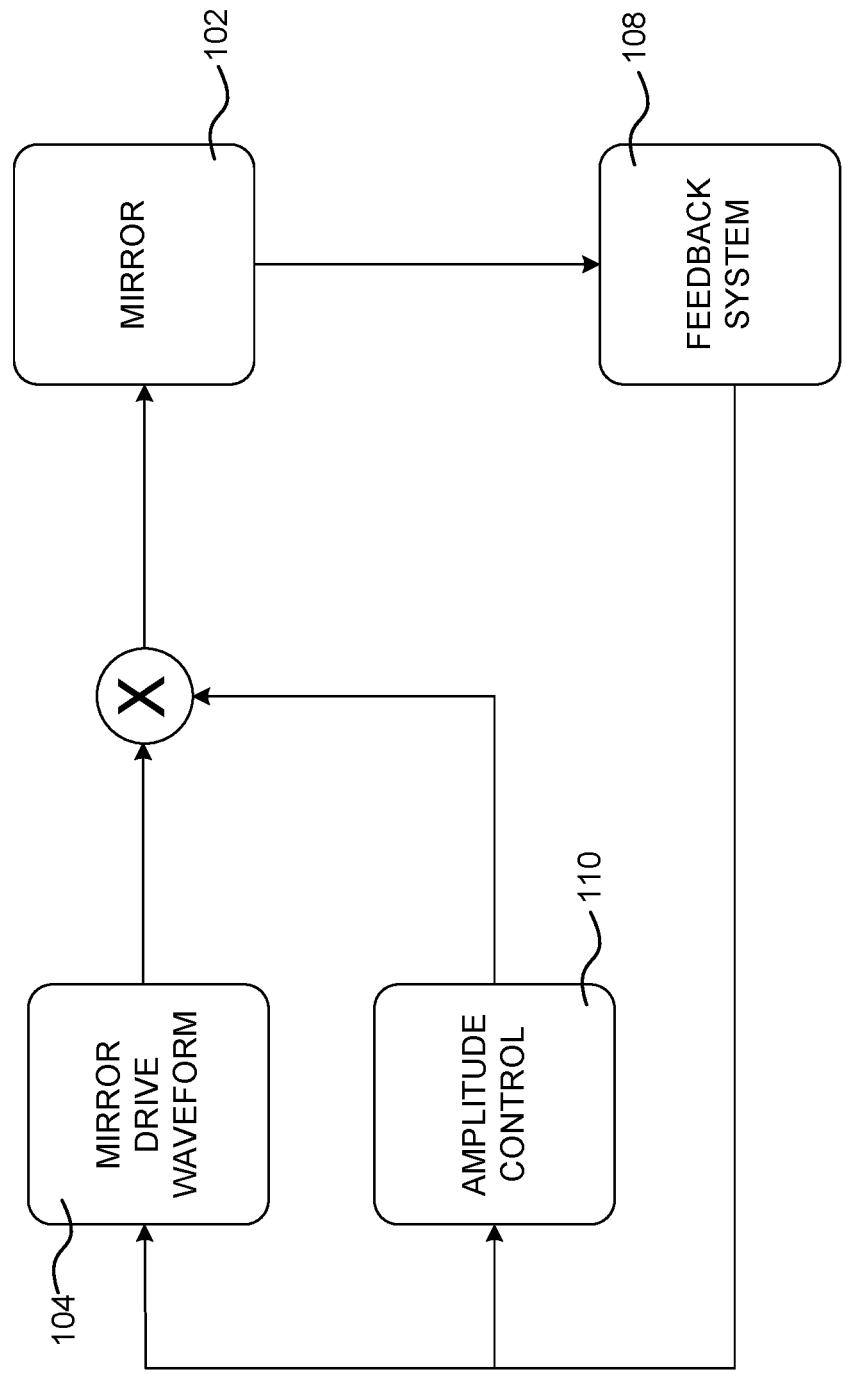
FIG. 1 shows an illustrative configuration of a mirror control system for an LBS display device.

The following detailed description is directed to technologies for improving display image quality in an LBS display device. In some implementations, the LBS display device may have two scanning MEMS mirrors. A fast scan (FS) mirror scans under resonance (vertical scanning of the display), and the slow scan (SS) mirror scans linearly. The linearity of the SS trajectory is an important aspect of display image quality in an LBS display device.

An LBS display device is typically worn and as such, may be subject to sudden movements which results in an instantaneous impulse to the system. The disturbance resulting from the sudden movement, if allowed to enter the system, may affect the image projected on the LBS display device, resulting in undesirable impacts to the image. In the LBS display device, a function of the SS controller is to closely follow the target trajectory under all operation conditions. In particular, when the SS is subject to sudden disturbance forces (electrical or mechanical), it is desirable for the SS controller to minimize the disturbance impact on the SS's trajectory. The ability to limit or cancel the disturbance by the controller may be referred to as the disturbance rejection.

Through implementations of the disclosed technologies, an LBS architecture may be implemented to improve disturbance rejection while maintaining a performant forward response. Other technical benefits not specifically mentioned herein can also be realized through implementations of the disclosed subject matter.

In the following detailed description, references are made to the accompanying drawings that form a part hereof, and which are shown by way of illustration specific configurations or examples. Referring now to the drawings, in which like numerals represent like elements throughout the several FIGS., aspects of various technologies for protecting mirrors in an LBS display device will be described.

FIG. 1 shows an illustrative configuration of a mirror control system for an LBS display device that does not provide disturbance rejection. As discussed briefly above, LBS display devices form displayed images by using one or more mirrors 102, such as MEMS mirrors, to direct a laser beam onto a display region. In such display devices, a mirror drive waveform 104 causes a mirror 102 to move over the course of a frame to control the location in the display region toward which the laser beam is directed.

As also described briefly above, mirrors 102 used by LBS display devices are susceptible to physical shock that can subject the mirror to undesired effects in certain circumstances.

Figure 3A:
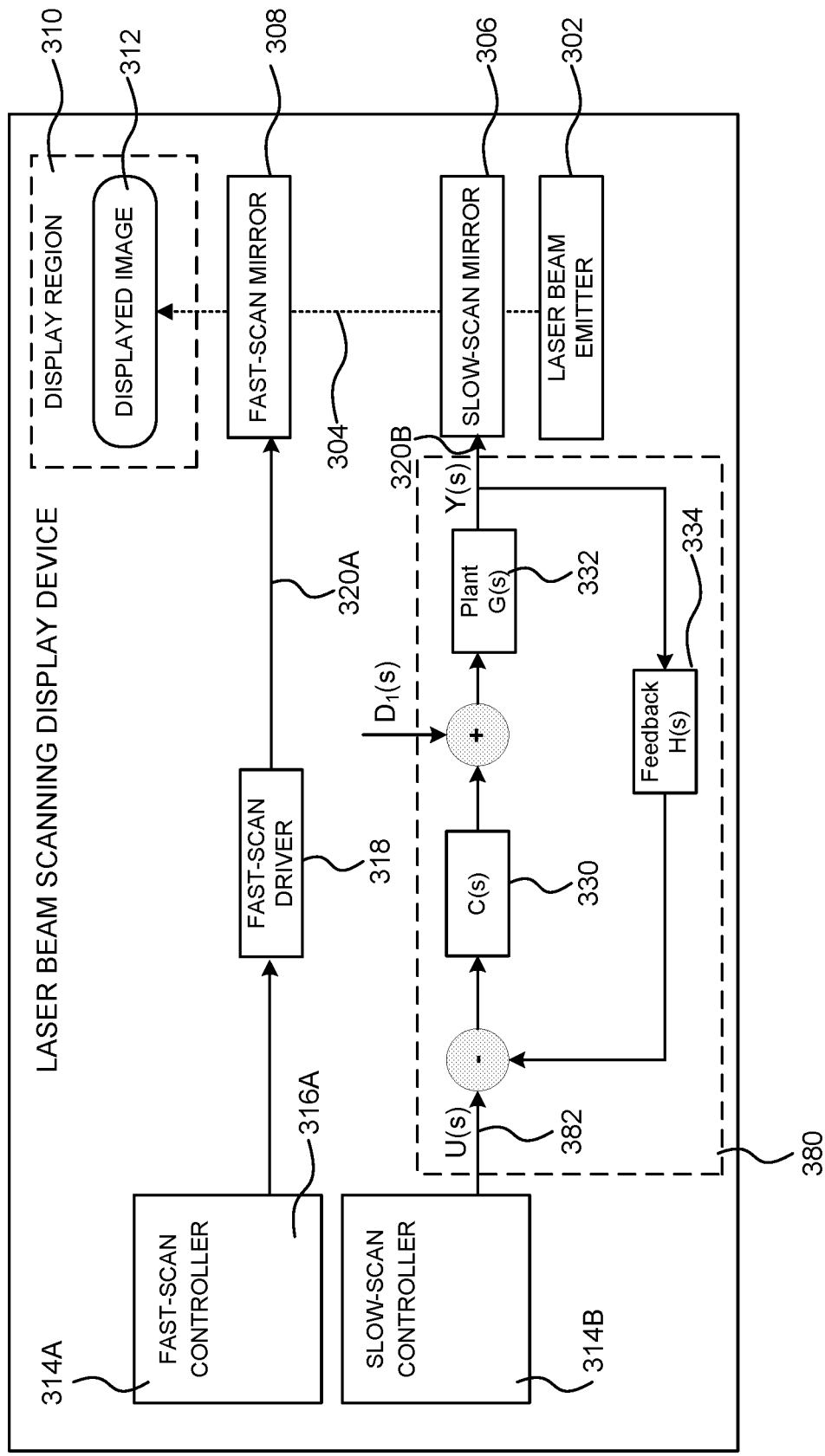
FIG. 3A is a device configuration diagram that illustrates aspects of the configuration of an LBS display device that provides functionality for disturbance rejection, according to one embodiment disclosed herein.

FIGS. 3A-3D are device configuration diagrams that illustrate several configurations of an LBS display device 300 that includes functionality for disturbance rejection for mirrors as described therein, such as MEMS mirrors. With reference to FIG. 3A, in order to realize the technical benefits mentioned briefly above, and potentially others, the LBS display device 300 includes a laser beam emitter 302 configured to emit a laser beam 304. For example, the laser beam emitter 302 may be a laser diode.

The laser beam 304 may impinge upon a display region 310 of the LBS display device 300 to form a displayed image 312. For example, the display region 310 may be a display of a head-mounted display device and the displayed image 312 may include one or more virtual objects.

The illustrative LBS display device 300 also includes two mirrors: a slow-scan mirror 306 and a fast-scan mirror 308. The mirrors 306 and 308 are MEMS mirrors in one embodiment.

The slow-scan mirror 306 and the fast-scan mirror 308 may be configured to reflect the laser beam 304 onto the display region 310. The displayed image 312 may be displayed in one or more frames in which the slow-scan mirror 306 and the fast-scan mirror 308 direct the laser beam 304 across the display region 310 to "draw" the displayed image 312.

In some embodiments, the slow-scan mirror 306 is configured to complete a slow-scan period during each frame. The slow-scan period may include a display interval. The slow-scan mirror 306 may linearly scan across the display region 310 from an initial scanning position to a final scanning position. The laser beam emitter 302 may be configured to emit the laser beam 302 during the display interval. In the display interval, the fast-scan mirror 308 may perform multiple scans across the display region 310 to "draw" the displayed image 312.

The slow-scan period may further include a non-display interval. During the non-display interval, the slow-scan mirror 306 may be configured to return from the final scanning position to the initial scanning position. This portion of the non-display interval may also be referred to as "the flyback."

During the non-display interval, the laser beam emitter 304 may be configured to not emit the laser beam 304. In some embodiments, the display region 310 may include one or more blank regions in which the displayed image 312 is not displayed. In addition to the flyback, the non-display interval may include time during which the slow-scan mirror 306 is oriented toward the one or more blank regions. The initial scanning position and the final scanning position may be located in the one or more blank regions.

The fast-scan mirror 308 may be driven by a driving signal 320A generated by a fast-scan driver 318. A fast-scan controller 314A generates an output for controlling the operation of the fast-scan driver 318. Similarly, the slow-scan mirror 306 can be driven by a driving signal 320B generated by the illustrated control system. A slow-scan controller 314B generates an output for controlling the operation of the slow-scan mirror 306.

In the embodiment shown in FIG. 3A, further details for the mirror control system 380 is now described. C(s) 330 is the forward controller, G(s) 332 is the plant (SS MEMS), and H(s) 334 represents the feedback controller. U(s) is the input/drive signal from slow-scan controller 314B. Di(s) represents the disturbance signals and Y(s) is the output of the control loop. The total response/output may be written as:

$$Y(S) = \frac{C(S)*G(S)}{1+C(S)*G(S)*H(S)} * U(S) + \frac{G(S)}{1+C(S)*G(S)*H(S)} * D_1(S)$$

The first part of the formula shows the mirror response under the driving signal. This part should follow the driving signal as close as possible, which provides:

$$\frac{C(S)*G(S)}{1+C(S)*G(S)*H(S)} \approx \text{Constant}$$

The second part of the formula shows the mirror response under disturbance. This part should be as small as possible, which provides:

$$\frac{G(S)}{1+C(S)*G(S)*H(S)} \leq 1$$

Figure 3B:
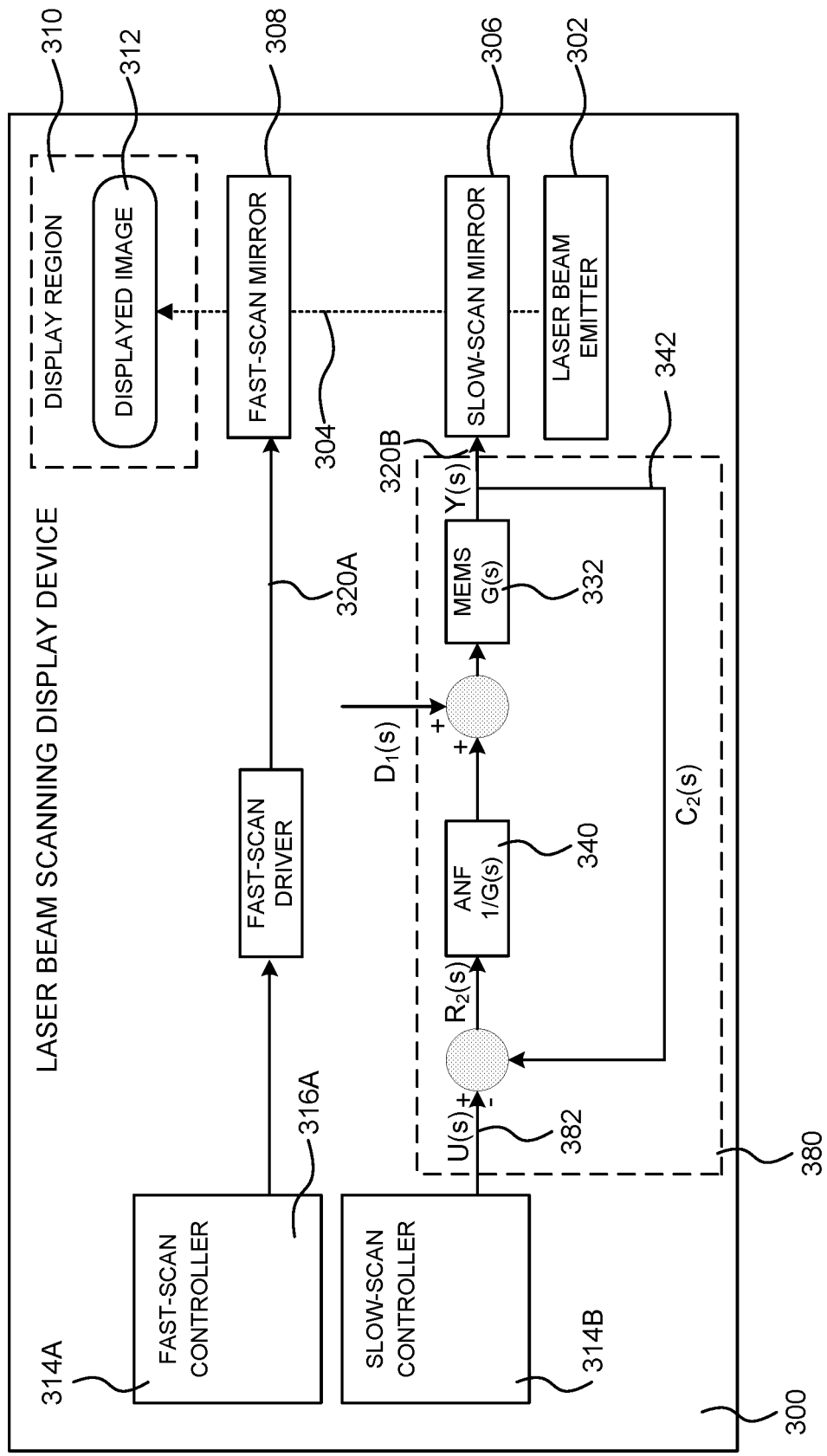
FIG. 3B is a device configuration diagram that illustrates aspects of the configuration of an LBS display device that provides functionality for disturbance rejection, according to another embodiment disclosed herein.

A controller design with a filter, such as an adaptive notch filter (ANF) 340, is shown in FIG. 3B. In this design, the ANF 340 is only inside the inner loop. The controller design in FIG. 3B may provide resonance damping of the SS mirror. But due to low gain at resonance, the disturbance rejection performance may not provide the desired amount of rejection.

With a sufficient ANF C(s), in one embodiment C(s)=1/G(s) at natural resonance frequency. In an initial design, H(s)=1. The first item of the formula may be simplified as:

$$\frac{C(S)*G(S)}{1+C(S)*G(S)*H(S)} = \frac{1/G(S)*G(S)}{1+1/G(S)*G(S)*H(S)} = \frac{1}{2}$$

Figure 2A:
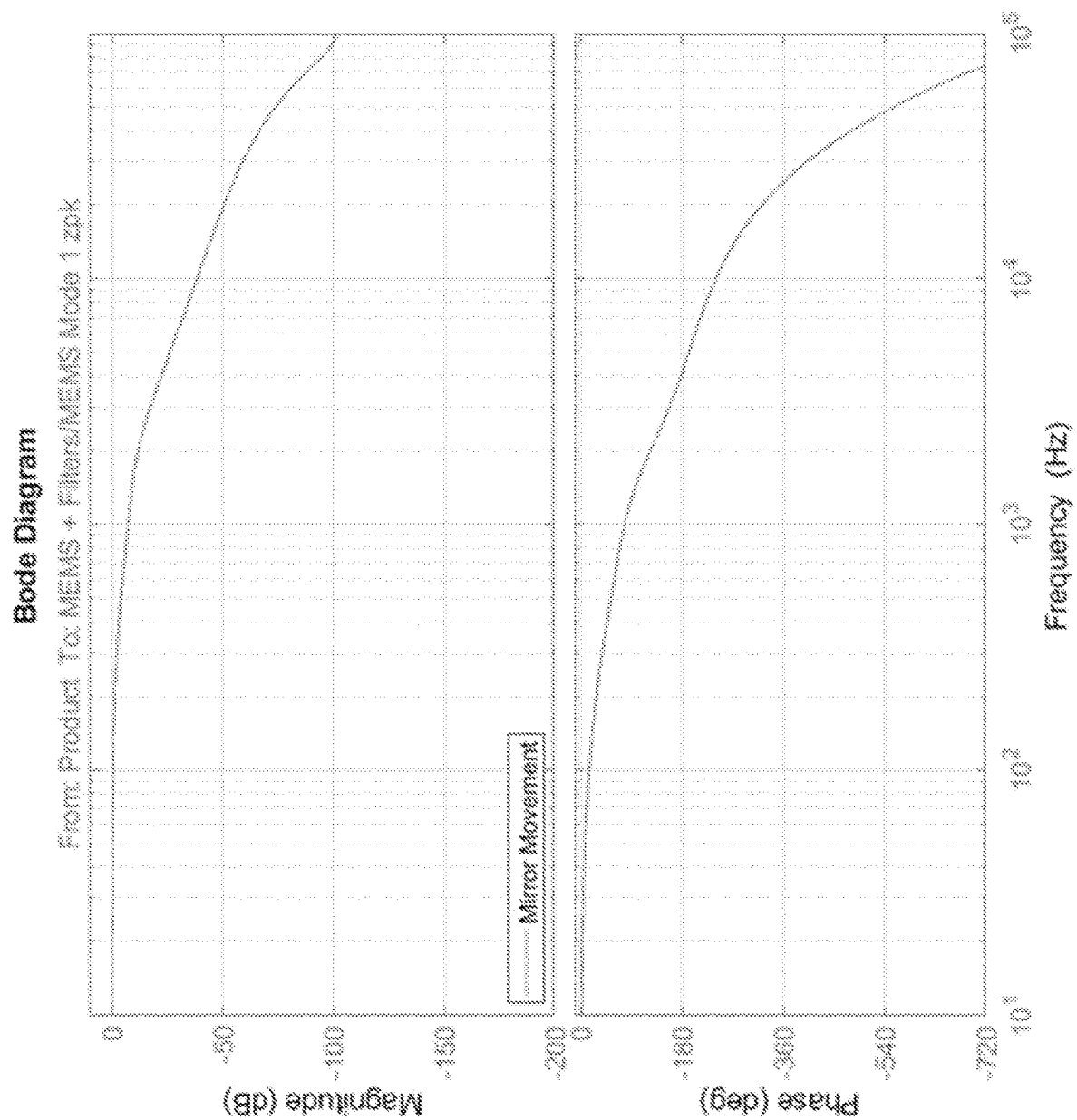
FIG. 2A is a diagram showing disturbance effects in a mirror control system.

The output is ½, which means that the mirror motion closely follows the designed trajectory. The bode plots shown in FIGS. 2A and 2B have no peak around the natural resonant frequency, which indicates that the ANF enables sufficient damping for the control loop.

Additionally, the second part of the formula shown above may be simplified as:

$$\frac{G(S)}{1+C(S)*G(S)*H(S)} = \frac{G(S)}{1+1/G(S)*G(S)*H(S)} = \frac{1}{2}G(S)$$

Figure 2B:
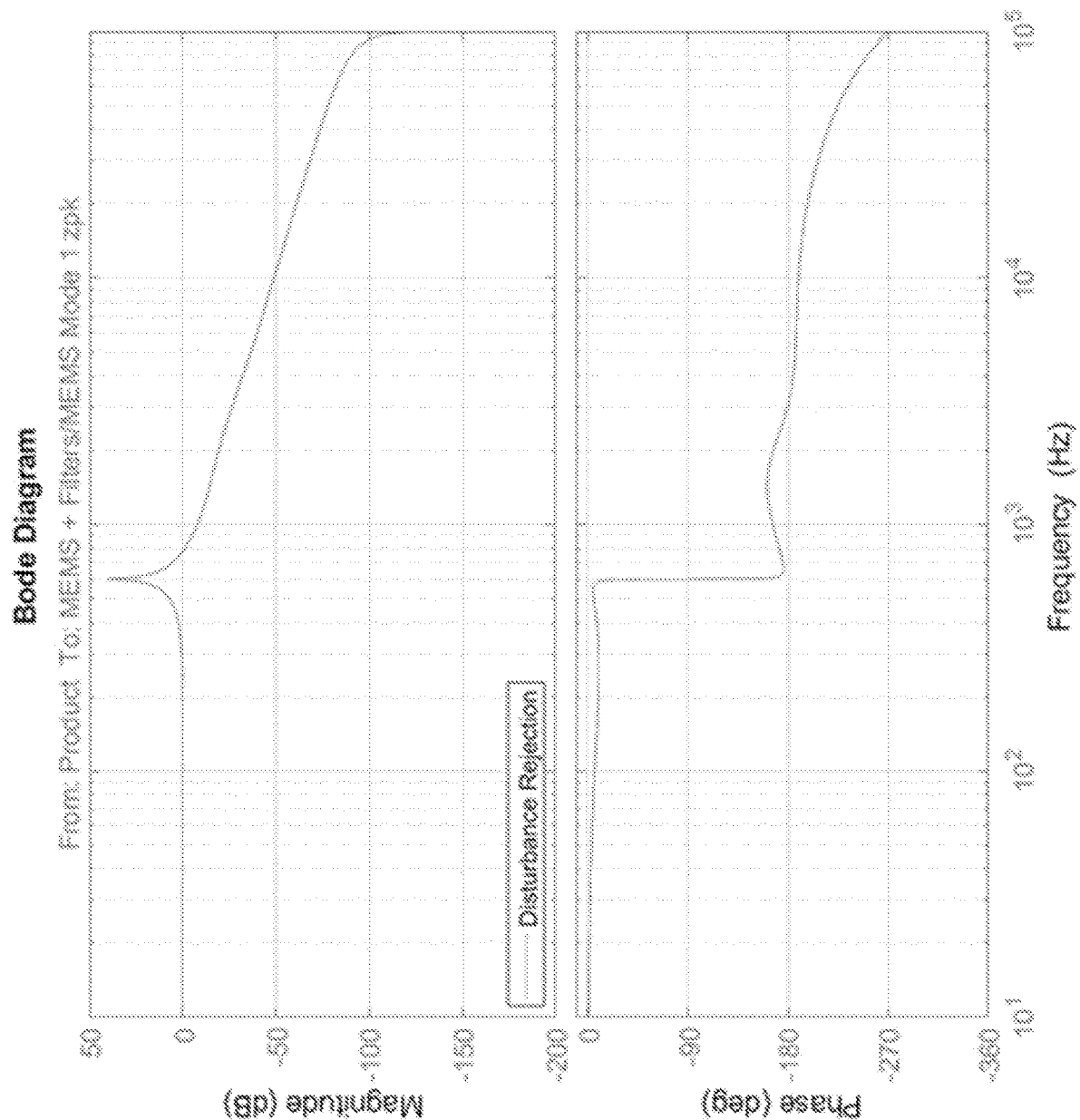
FIG. 2B is a diagram showing disturbance effects in a mirror control system.

From the above formula and the bode plot in FIG. 2B, a peak may be observed around the natural frequency of the SS mirror. Any disturbance around the natural frequency may excite strong unwanted vibrations and degrade the display quality.

Figure 3C:
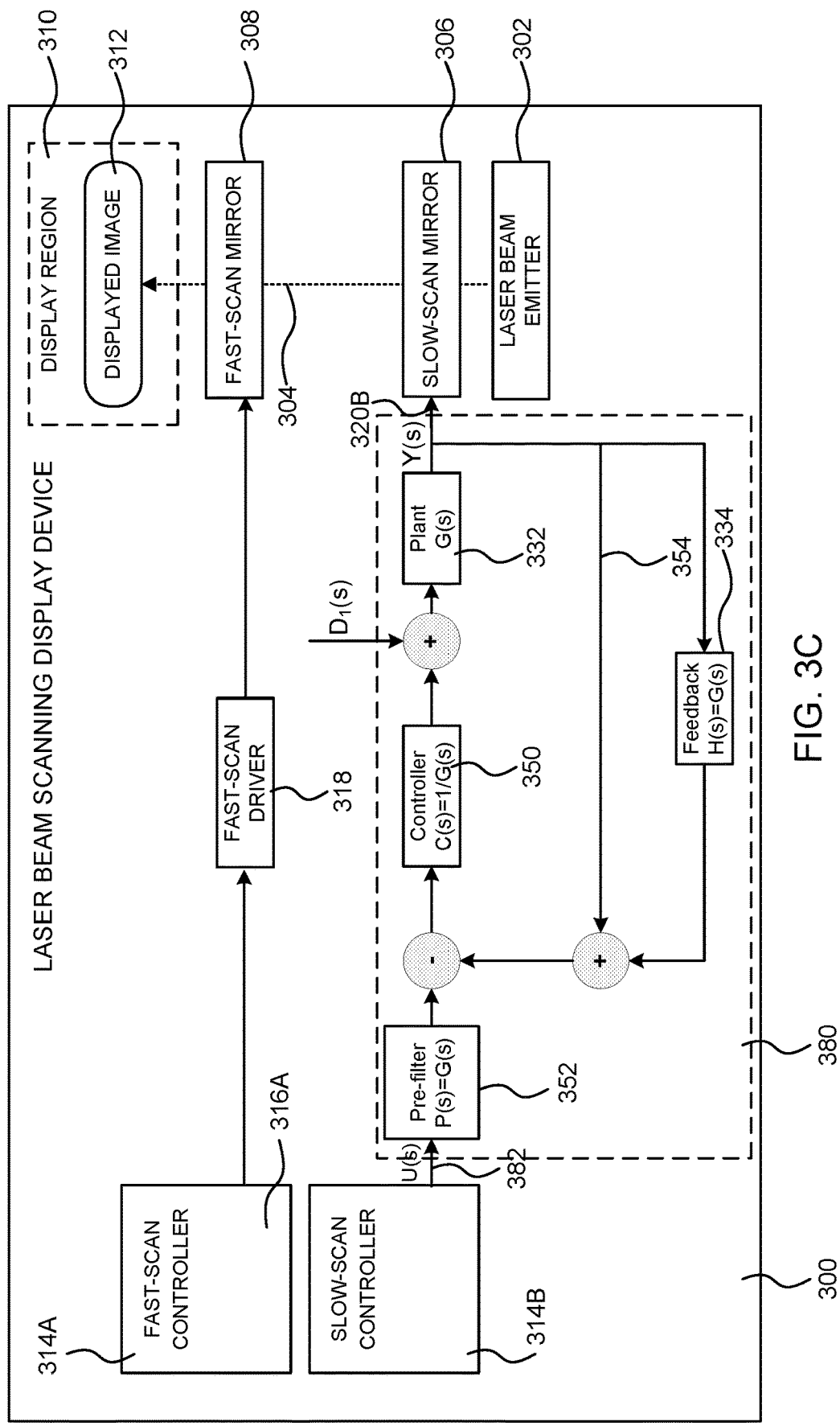
FIG. 3C is a device configuration diagram that illustrates aspects of the configuration of an LBS display device that provides functionality for disturbance rejection, according to yet another embodiment disclosed herein.

In an embodiment, based on the disturbance rejection part shown above, if H(s)=G(s), and if a parallel feedback loop is added, the disturbance rejection can be significantly improved while maintaining control loop stability. In some embodiments, the parallel feedback loop may have a constant gain. The modified control system is shown in FIG. 3C. FIG. 3C shows a pre-filter 352 with P(s)=G(s), controller 350 with C(s)=1/G(s), plant 332 G(s), feedback 334 H(s)=G(s), and parallel unit feedback 354.

The total response/output of the control system shown in FIG. 3C may be written as:

$$Y(S) = \frac{P(S)*C(S)*G(S)}{1+C(S)*G(S)*H(S)+C(S)*G(S)} * U(S) + \frac{G(S)}{1+C(S)*G(S)*H(S)+C(S)*G(S)} * D_1(S)$$

If P(s)=H(s)=G(s), then the first part of the formula shows the mirror response under the driving signal, which is:

$$\frac{P(S)*C(S)*G(S)}{1+C(S)*G(S)*H(S)+C(S)*G(S)} =$$

$$\frac{G(S)*\frac{1}{G(S)}*G(S)*1}{1+\frac{1}{G(S)}*G(S)*1*G(S)+\frac{1}{G(S)}*G(S)*1} = \frac{G(S)}{2+G(S)}$$

$$\frac{G(S)}{2+G(S)} \approx \text{Constant, when } G(s) \gg 2$$

Figure 4A:
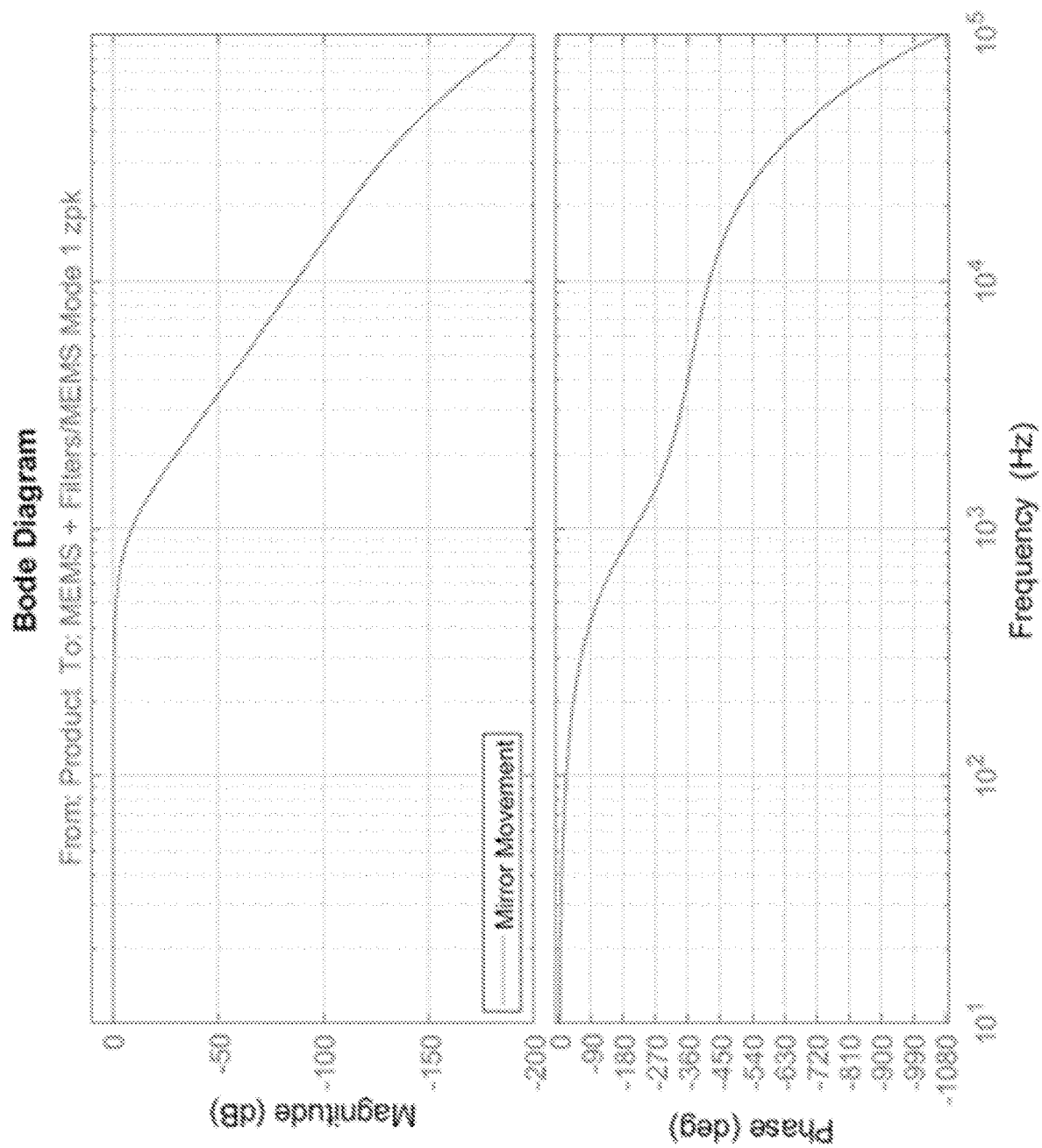
FIG. 4A is a diagram illustrating aspects of a smoothed output with disturbance rejection, according to an embodiment disclosed herein.

Normally G(s)>>2 around the resonant frequency, especially when the system includes a high Q SS mirror. An example bode plot of the forward response is shown in FIG. 4A.

The second part of the formula shows the disturbance rejection, which is:

$$\frac{G(S)}{1+C(S)*G(S)*H(S)+C(S)*G(S)} =$$

$$\frac{G(S)*1}{1+\frac{1}{G(S)}*G(S)*G(S)+\frac{1}{G(S)}*G(S)} = \frac{G(S)}{2+G(S)}$$

$$\frac{G(S)}{2+G(S)} \approx \text{Constant, when } G(s) \gg 2$$

Figure 4B:
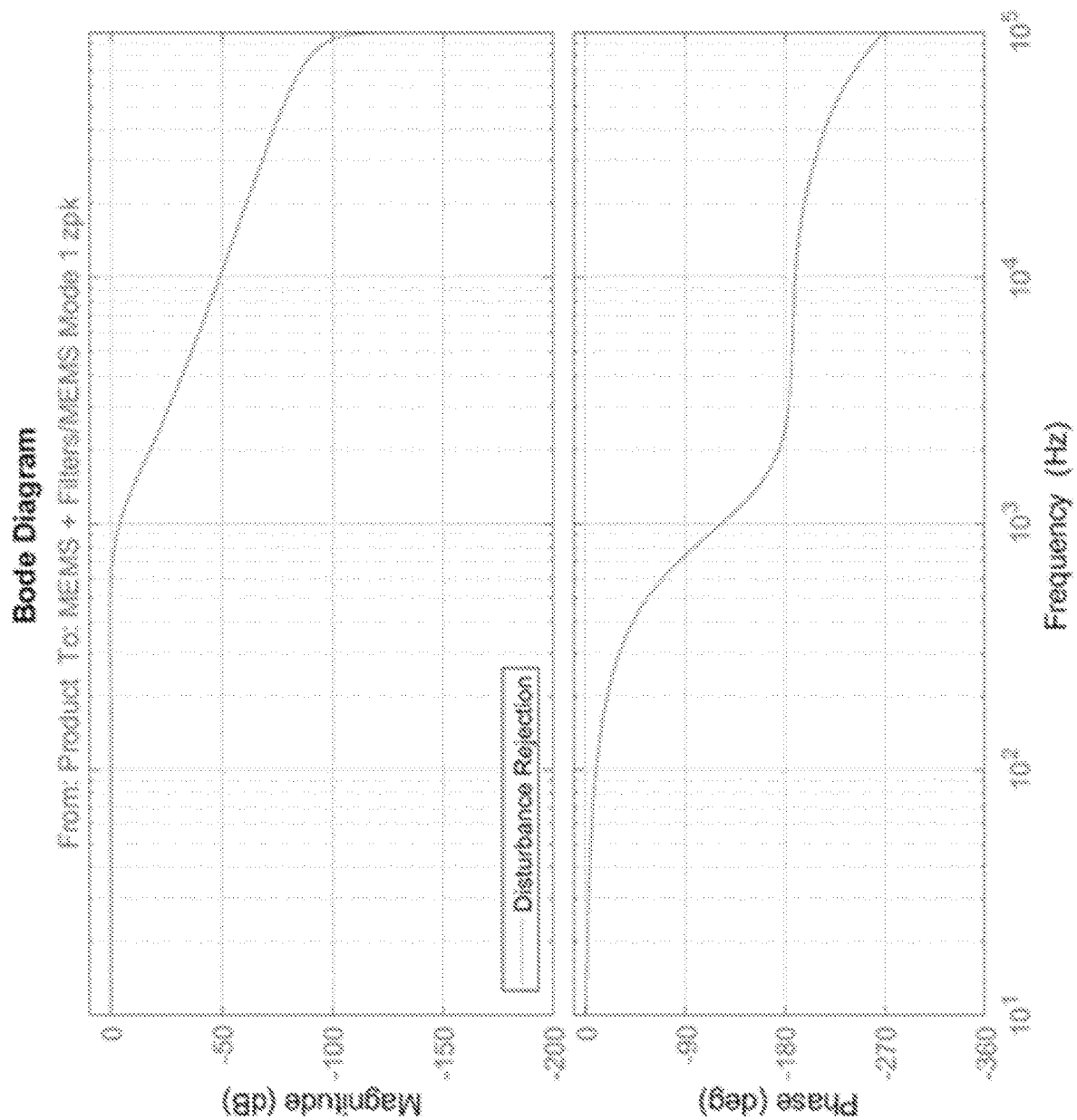
FIG. 4B is a diagram illustrating aspects of a smoothed output with disturbance rejection, according to an embodiment disclosed herein.

Accordingly, the disturbance rejection has the same response as the forward response and no peak around the natural resonant frequency, which is shown in FIG. 4A and FIG. 4B. By adding a further feedback loop with an appropriate feedback controller, the disturbance rejection may thus be further improved.

Figure 3D:
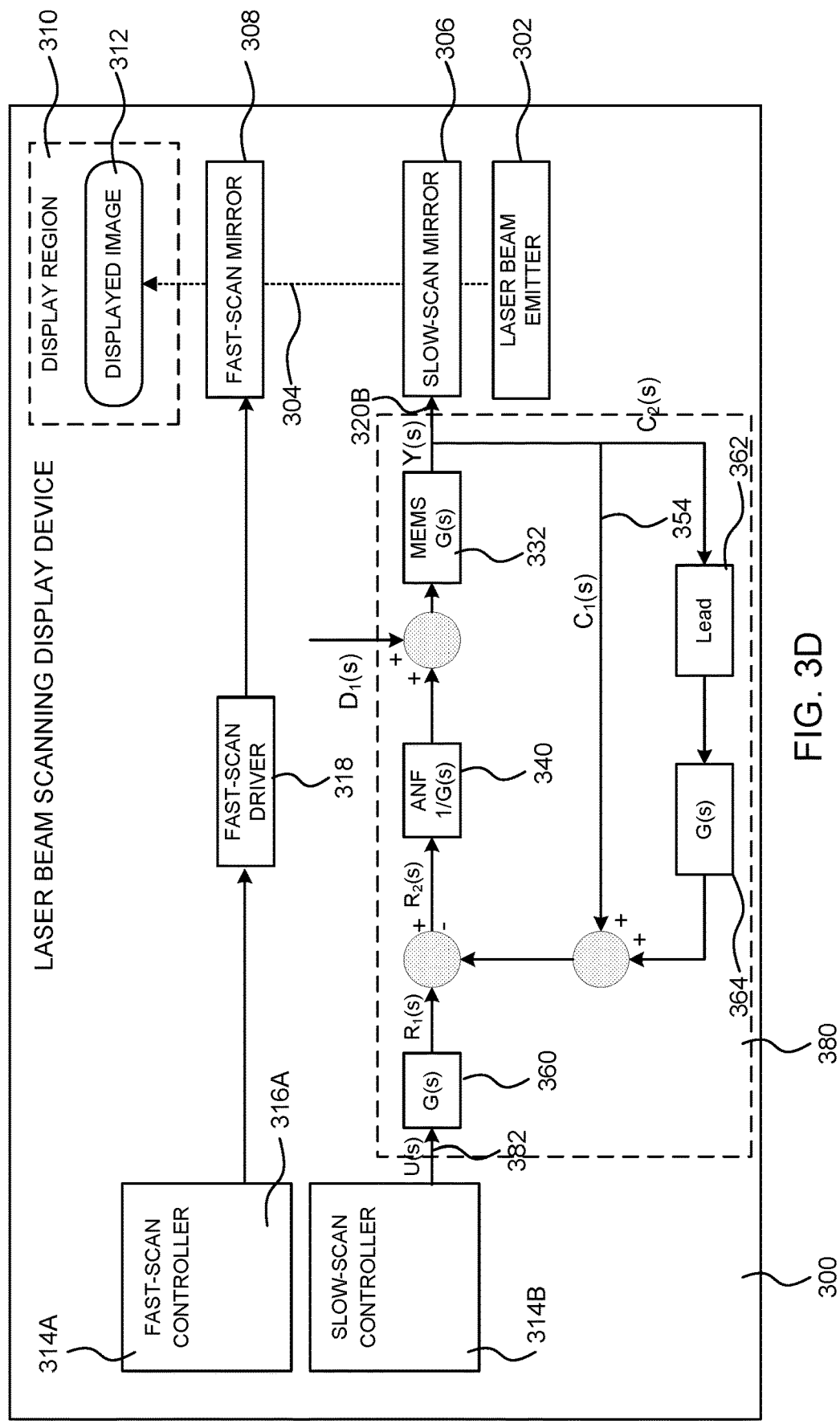
FIG. 3D is a device configuration diagram that illustrates aspects of the configuration of an LBS display device that provides functionality for disturbance rejection, according to yet another embodiment disclosed herein.

In an embodiment, by combining a notch filter, such as an ANF, and feedback controller, the SS mirror controller can provide disturbance rejection capability and with accurate tracking. Furthermore, by adding compensators (e.g., lead/lag compensators) to the feedback controller, the stability of the entire control loop can be improved with increased phase margin and gain margin. An example implementation of a control architecture as disclosed herein is shown in FIG. 3D. FIG. 3D shows a pre-filter 360 with P(s)=G(s), ANF 340 with C(s)=1/G(s), plant (MEMS) 332 G(s), feedback 364 H(s)=G(s), lead compensator 362, and parallel unit feedback 354. In further embodiments, multiple notch filters, prefilters, compensators may be included in the control architecture.

The disclosed embodiments can be implemented using a number of technologies. For example, embodiments can be implemented using software/firmware (e.g., digital Si logic, FPGA, firmware), or hardware (PCB board with discrete components), or a combination of hardware and software. For example, filters such as P(s)=G(s) and H(s)=G(s) may be implemented using analog filters. The poles and zeros may be adjusted by using appropriate resistors and capacitors. The ANF may be implemented using DSP chips or embedded CPUs. The various components may be soldered on a single PCB.

Figure 5:
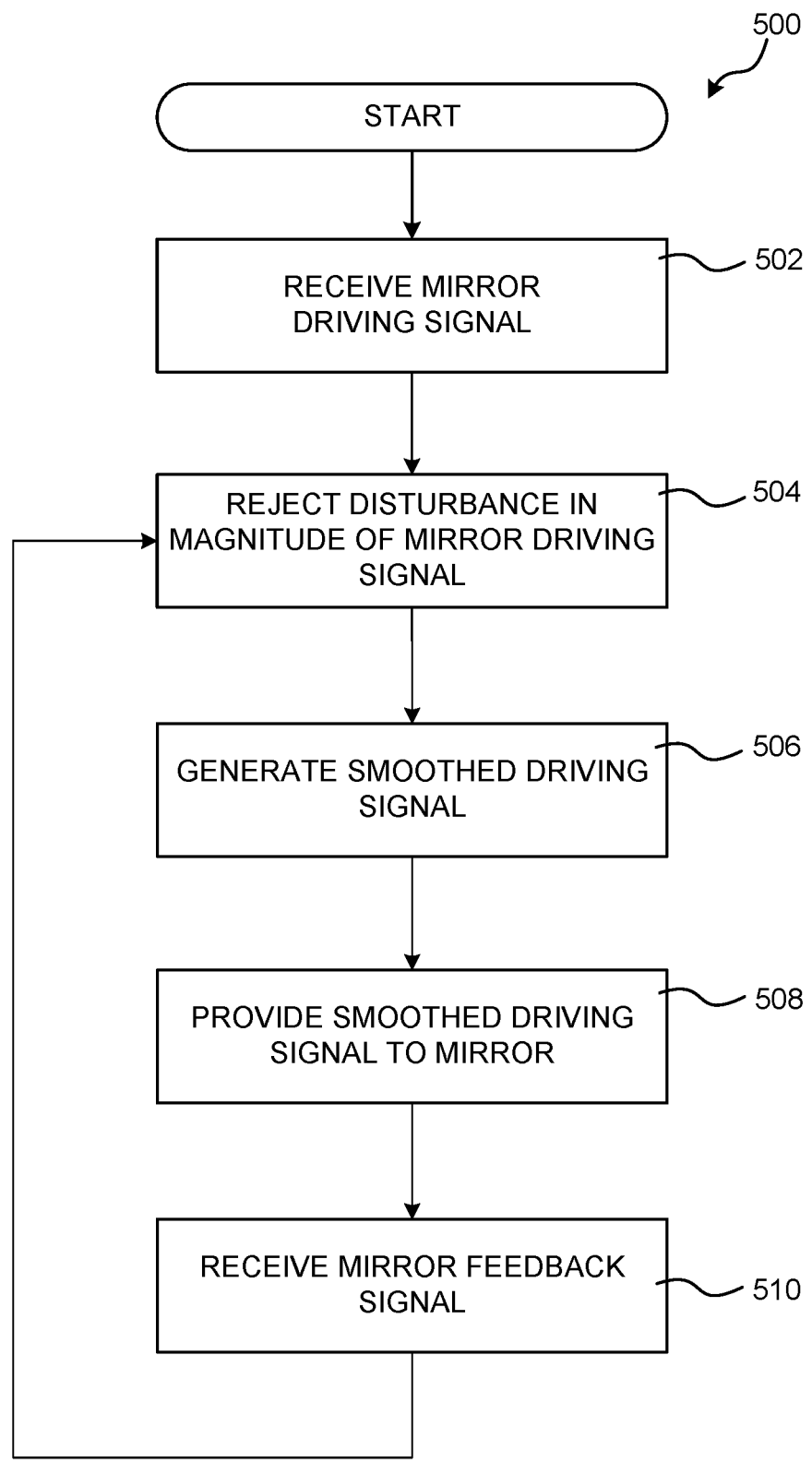
FIG. 5 is a flow diagram showing aspects of a routine for disturbance rejection in an LBS display device, according to one embodiment disclosed herein.

FIG. 5 is a flow diagram showing a routine 500 that illustrates aspects of the operation of a control system with disturbance rejection, which was described above with reference to FIGS. 1-4, according to one embodiment disclosed herein. It should be appreciated that the particular implementation of the technologies disclosed herein is a matter of choice dependent on the performance and other requirements of the computing device. Accordingly, the logical operations described herein are referred to variously as states, operations, structural devices, acts, or modules.

These states, operations, structural devices, acts and modules can be implemented in hardware, software, firmware, in special-purpose digital logic, and any combination thereof. It should be appreciated that more or fewer operations can be performed than shown in the FIGS. and described herein. These operations might also be performed in a different order than those described herein.

The routine 500 begins at operation 502, where controller 380 receives the driving signal 382. The routine 500 then proceeds from operation 502 to operation 504, where the controller 380 rejects a disturbance. The disturbance may be rejected based on a feedback signal if available.

From operation 504, the routine 500 proceeds to operation 506, where a smoothed driving signal is generated.

From operation 506, the routine 500 proceeds to operation 508, where the smoothed, driving signal is provided to the mirror 306. From operation 508, the routine 500 proceeds to operation 510, where a feedback signal is received. The routine 500 then proceeds from operation 510 back to operation 504, where the disturbance in the system can be rejected.

Figure 6:
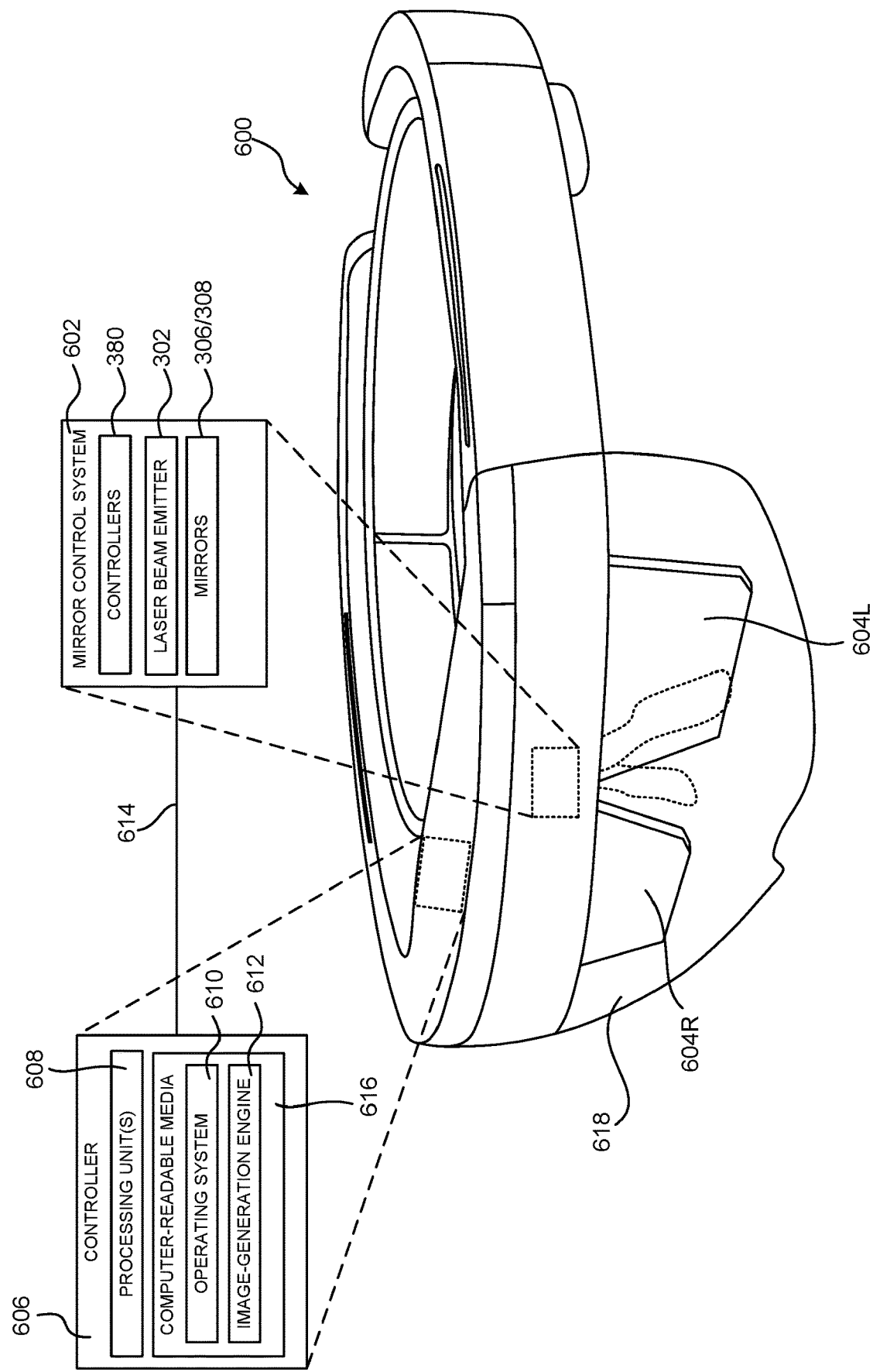
FIG. 6 shows aspects of the configuration of an illustrative near-eye display ("NED") device that includes a mirror control system implementing aspects of the technologies disclosed herein.

FIG. 6 shows aspects of the configuration of an illustrative near-eye display ("NED") device 600 that includes a mirror control system 602 implementing aspects of the technologies disclosed herein. The mirror control system 602 includes the laser beam emitter 302, the mirrors 306 and 308, and controllers 380. Each of these components was described in detail above with regard to FIGS. 1-5.

In some examples, the NED device 600 may utilize the mirror control system 602 to generate a composite view (e.g., from a perspective of a user that is wearing the NED device 600) that includes both one or more computer-generated ("CG") images and a view of at least a portion of the real-world environment 62 surrounding the NED device 600. For example, the mirror control system 602 may utilize various technologies such as, for example, augmented reality ("AR") technologies to generate composite views that include CG images superimposed over a real-world view. As such, the mirror control system 602 may be configured to generate CG images via a display panel 604.

In the illustrated example, the display panel 604 includes separate right eye and left eye transparent display panels, labeled 604R and 604L, respectively. In some examples, the display panel 604 may include a single transparent display panel that is viewable with both eyes and/or a single transparent display panel that is viewable by a single eye only.

It can be appreciated that the techniques described herein may be deployed within a single-eye NED device 600 (e.g. GOOGLE GLASS) and/or a dual-eye NED device 600 (e.g. MICROSOFT HOLOLENS). The NED device 600 shown in FIG. 6 is an example device that is used to provide context and illustrate various features and aspects of the mirror control system 602 disclosed herein. Other devices and systems may also use the mirror control system 602 disclosed herein.

In some examples, the display panel 604 may be a waveguide display that includes one or more diffractive optical elements ("DOEs") for in-coupling incident light into a waveguide, expanding the incident light in one or more directions for exit pupil expansion, and/or out-coupling the incident light out of the waveguide (e.g., toward a user's eye). In some examples, the NED device 600 may further include an additional see-through optical component in the form of a transparent veil 618 positioned between the real-world environment (which real-world environment makes up no part of the claimed invention) and the display panel 604.

It can be appreciated that the transparent veil 618 may be included in the NED device 600 for purely aesthetic and/or protective purposes. The NED device 600 may further include various other components, for example speakers, microphones, accelerometers, gyroscopes, magnetometers, temperature sensors, touch sensors, inertial measurement sensors, biometric sensors, other image sensors, energy-storage components (e.g. battery), a communication facility, a global positioning system ("GPS") receiver, etc.

In the illustrated example, a controller 606 is operatively coupled to the mirror control system 602. The controller 606 includes one or more logic devices and one or more computer memory devices storing instructions executable by the logic device(s) to deploy aspects of the functionality described herein with relation to the mirror control system 602. The controller 606 and the mirror control system 602 of the NED device 600 are operatively connected, for example, via a bus 614, which can include one or more of a system bus, a data bus, an address bus, a PCI bus, a Mini-PCI bus, and any variety of local, peripheral, and/or independent buses.

The controller 606 can also include one or more processing units 608. The processing unit(s) 608, can represent, for example, a CPU-type processing unit, a GPU-type processing unit, a field-programmable gate array ("FPGA"), a digital signal processor ("DSP"), or other hardware logic components that may, in some instances, be driven by a CPU. For example, and without limitation, illustrative types of hardware logic components that can be used include Application-Specific Integrated Circuits ("ASICs"), Application-Specific Standard Products ("ASSPs"), System-on-a-Chip Systems ("SOCs"), Complex Programmable Logic Devices ("CPLDs"), etc.

The controller 606 can also include one or more computer-readable media 616 storing an operating system 610 and data such as, for example, image data that defines one or more CG images for presentation by the NED device 600. The computer-readable media 616 may further include an image-generation engine 612 that generates output signals to control aspects of the operation of the mirror control system 602 to present the CG images.

As used herein, computer-readable media, such as computer-readable media 616, can store instructions executable by the processing units 608. The computer-readable media 616 can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in the NED device 600, while in some examples one or more of a CPU, GPU, and/or accelerator are external to the NED device 600.

As used herein, the term computer-readable media can include computer storage media and/or communication media. Computer storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data.

Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, rotating media, optical cards or other optical storage media, magnetic storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device in a non-transitory fashion.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Figure 7:
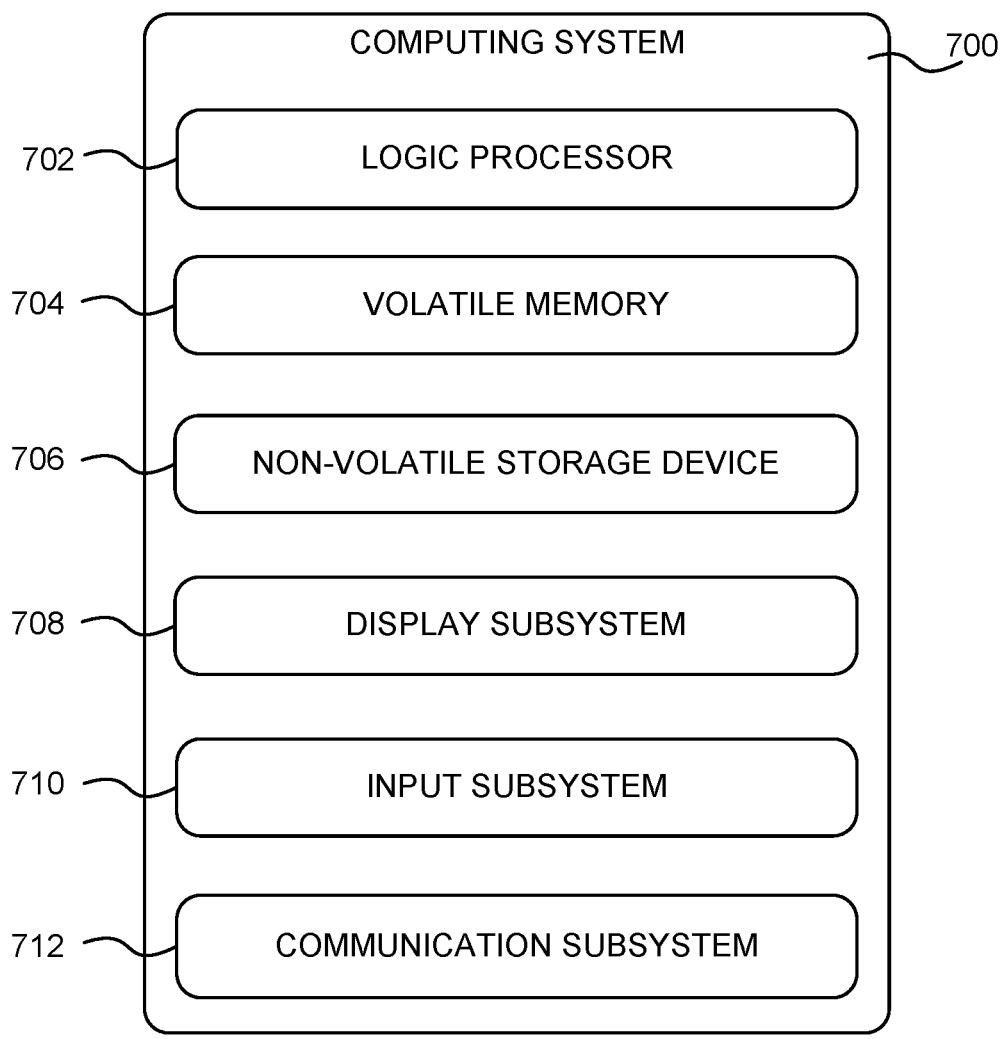
FIG. 7 shows a schematic view of an example computing environment in which aspects of the technologies disclosed herein can be implemented.

FIG. 7 shows a schematic view of an example computing environment in which aspects of the technologies disclosed herein can be implemented. In particular, FIG. 7 schematically shows anon-limiting embodiment of a computing system 700 that can be used to implement the technologies disclosed herein. Computing system 700 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 700 includes a logic processor 702 volatile memory 704, and a non-volatile storage device 706. Computing system 700 may optionally include a display subsystem 708, input subsystem 710, communication subsystem 712, and/or other components not shown in FIG. 7.

Logic processor 702 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 702 may include one or more physical processors (i.e. hardware) configured to execute software instructions. Additionally, or alternatively, the logic processor 702 may include one or more hardware logic circuits or firmware devices configured to execute hardware-implemented logic or firmware instructions.

The logic processor 702 may be single-core or multi-core, and the instructions executed thereon may be configured for sequential, parallel, and/or distributed processing. Individual components of the logic processor 702 optionally may be distributed among two or more separate devices, which may be remotely located and/or configured for coordinated processing. Aspects of the operation of the logic processor 702 may be virtualized and executed by remotely accessible, networked computing devices configured in a cloud-computing configuration. In such a case, these virtualized aspects are run on different physical logic processors of various different machines, it will be understood.

Non-volatile storage device 706 includes one or more physical devices configured to hold instructions executable by the logic processors to implement aspects of the methods and processes described herein. When such methods and processes are implemented, the state of non-volatile storage device 706 may be transformed—e.g., to hold different data.

Non-volatile storage device 706 may include physical devices that are removable and/or built-in. Non-volatile storage device 706 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 706 may include nonvolatile, dynamic, static, read/write, read-only, sequential-access, location-addressable, file-addressable, and/or content-addressable devices. It will be appreciated that non-volatile storage device 706 is configured to hold instructions even when power is cut to the non-volatile storage device 706.

Volatile memory 704 may include physical devices that include random access memory. Volatile memory 704 is typically utilized by logic processor 702 to temporarily store information during processing of software instructions. It will be appreciated that volatile memory 704 typically does not continue to store instructions when power is removed from the volatile memory 704. Aspects of logic processor 702, volatile memory 704, and non-volatile storage device 706 may be integrated together into one or more hardware-logic components, such as within an ASIC, SOC, or FPGA.

The terms "module," "program," and "engine" may be used to describe an aspect of computing system 700 typically implemented in software by a processor 702 to perform a particular function using portions of volatile memory 704, which function involves transformative processing that specially configures the processor 702 to perform the function. Thus, a module, program, or engine may be instantiated via logic processor 702 executing instructions held by non-volatile storage device 706, using portions of volatile memory 704.

It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 708 may be used to present a visual representation of data held by non-volatile storage device 706. The visual representation may take the form of a graphical user interface ("GUI"). As the herein described methods and processes change the data held by the non-volatile storage device, and thus transform the state of the non-volatile storage device, the state of display subsystem 708 may likewise be transformed to visually represent changes in the underlying data. Display subsystem 708 may include one or more display devices utilizing virtually any type of technology, such as the LBS display devices disclosed herein. Such display devices may be combined with logic processor 702, volatile memory 704, and/or non-volatile storage device 706 in a shared enclosure, or such display devices may be peripheral display devices.

When included, input subsystem 710 may comprise or interface with one or more user-input devices such as a keyboard, mouse, touch screen, or game controller. In some embodiments, the input subsystem may comprise or interface with selected natural user input ("NUI") componentry. Such componentry may be integrated or peripheral, and the transduction and/or processing of input actions may be handled on- or off-board.

Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 712 may be configured to communicatively couple various computing devices described herein with each other, and with other devices. Communication subsystem 712 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 700 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The disclosure presented herein also encompasses the subject matter set forth in the following clauses:

Clause 1. A display device, comprising:
a laser beam emitter configured to emit a laser beam;
a driver configured to generate a driving signal for controlling a microelectromechanical systems (MEMS) mirror, the MEMS mirror configured to reflect the laser beam onto a display region to generate an image; and
a controller configured to:
generate a driving signal while rejecting a system disturbance; and
provide the driving signal to the MEMS mirror.

Clause 2. The display device of clause 1, wherein the controller comprises a pre-filter with a transfer function equivalent to that of the MEMS mirror.

Clause 3. The display device of any of clauses 1 or 2, wherein the controller comprises a feedback loop with a transfer function equivalent to that of the MEMS mirror.

Clause 4. The display device of any of clauses 1-3, wherein the controller comprises a parallel feedback loop with constant gain.

Clause 5. The display device of any of clauses 1-4, wherein the controller comprises a notch filter.

Clause 6. The display device of any of clauses 1-5, wherein the notch filter is an adaptive notch filter with a transfer function that is a reciprocal of the transfer function of the MEMS mirror.

Clause 7. The display device of any of clauses 1-6, wherein the feedback loop includes a lead compensator.

Clause 8. The display device of any of clauses 1-7, wherein the MEMS mirror comprises a slow-scan mirror.

Clause 9. A display device comprising:
a laser beam emitter configured to emit a laser beam;
a first microelectromechanical systems (MEMS) mirror;
a second MEMS mirror;
a first driver configured to generate a first driving signal for controlling the first MEMS mirror;
a second driver configured to generate a second driving signal for controlling the second MEMS mirror, wherein the first driver and the second driver are configured to drive the first MEMS mirror and the second MEMS mirror respectively to reflect the laser beam onto a display region to generate an image; and
a controller configured to:
generate a driving signal while rejecting a system disturbance; and
provide the driving signal to the first MEMS mirror.

Clause 10. The display device of clause 9, wherein the first MEMS mirror comprises a slow-scan mirror and wherein the second MEMS mirror comprises a fast-scan mirror.

Clause 11. The display device of any of clauses 9 or 10, wherein the controller comprises a pre-filter with a transfer function equivalent to that of the first MEMS mirror.

Clause 12. The display device of any of clauses 9-11, wherein the controller comprises a feedback loop with a transfer function equivalent to that of the first MEMS mirror.

Clause 13. The display device of any of clauses 9-12, wherein the controller comprises a parallel feedback loop with constant gain.

Clause 14. The display device of any of clauses 9-13, wherein the controller comprises a notch filter.

Clause 15. The display device of any of clauses 9-14, wherein the notch filter is an adaptive notch filter with a transfer function that is a reciprocal of the transfer function of the first MEMS mirror.

Clause 16. The display device of any of clauses 9-15, wherein the feedback loop includes a lead compensator.

Clause 17. A display device comprising:
a laser beam emitter configured to emit a laser beam;
a slow-scan microelectromechanical systems (MEMS) mirror;
a slow-scan driver configured to generate a driving signal for controlling the slow-scan MEMS mirror; and
a controller configured to:
generate a driving signal while rejecting a system disturbance; and
provide the driving signal to the slow-scan MEMS mirror.

Clause 18. The display device of clause 17, wherein the controller comprises:
a pre-filter with a transfer function equivalent to that of the slow-scan MEMS mirror; and
a feedback loop with a transfer function equivalent to that of the slow-scan MEMS mirror.

Clause 19. The display device of any of clauses 17-18, wherein the controller comprises a parallel unit feedback loop.

Clause 20. The display device of any of clauses 17-19, wherein the controller comprises an adaptive notch filter with a transfer function that is a reciprocal of the transfer function of the slow-scan MEMS mirror.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A display device, comprising:
a laser beam emitter configured to emit a laser beam;
a driver configured to generate a driving signal for controlling a microelectromechanical systems (MEMS) mirror, the MEMS mirror configured to reflect the laser beam onto a display region to generate an image; and
a controller configured to:
generate a driving signal while rejecting a system disturbance; and
provide the driving signal to the MEMS mirror;
the controller comprising:
a pre-filter with a transfer function equivalent to that of the MEMS mirror;
a feedback loop with a transfer function equivalent to that of the MEMS mirror; and
a parallel feedback loop with a constant gain.

2. The display device of claim 1, wherein the controller comprises a notch filter.

3. The display device of claim 2, wherein the notch filter is an adaptive notch filter with a transfer function that is a reciprocal of the transfer function of the MEMS mirror.

4. The display device of claim 1, wherein the feedback loop includes a lead compensator.

5. The display device of claim 1, wherein the MEMS mirror comprises a slow-scan mirror.

6. A display device comprising:
a laser beam emitter configured to emit a laser beam;
a first microelectromechanical systems (MEMS) mirror;
a second MEMS mirror;
a first driver configured to generate a first driving signal for controlling the first MEMS mirror;
a second driver configured to generate a second driving signal for controlling the second MEMS mirror, wherein the first driver and the second driver are configured to drive the first MEMS mirror and the second MEMS mirror respectively to reflect the laser beam onto a display region to generate an image; and
a controller configured to:
generate a driving signal while rejecting a system disturbance; and
provide the driving signal to the first MEMS mirror;
the controller comprising:
a pre-filter with a transfer function equivalent to that of the first MEMS mirror; and
a feedback loop with a transfer function equivalent to that of the first MEMS mirror.

7. The display device of claim 6, wherein the first MEMS mirror comprises a slow-scan mirror and wherein the second MEMS mirror comprises a fast-scan mirror.

8. The display device of claim 6, wherein the controller comprises a notch filter.

9. The display device of claim 8, wherein the notch filter is an adaptive notch filter with a transfer function that is a reciprocal of the transfer function of the first MEMS mirror.

10. The display device of claim 6, wherein the feedback loop includes a lead compensator.

11. A display device comprising:
a laser beam emitter configured to emit a laser beam;
a slow-scan microelectromechanical systems (MEMS) mirror;
a slow-scan driver configured to generate a driving signal for controlling the slow-scan MEMS mirror; and
a controller configured to:
generate a driving signal while rejecting a system disturbance; and
provide the driving signal to the slow-scan MEMS mirror;
the controller comprising:
a pre-filter with a transfer function equivalent to that of the slow-scan MEMS mirror;
a feedback loop with a transfer function equivalent to that of the slow-scan MEMS mirror; and
a parallel feedback loop.

12. The display device of claim 11, wherein the controller comprises an adaptive notch filter with a transfer function that is a reciprocal of the transfer function of the slow-scan MEMS mirror.

\* \* \* \* \*